Figure 1:
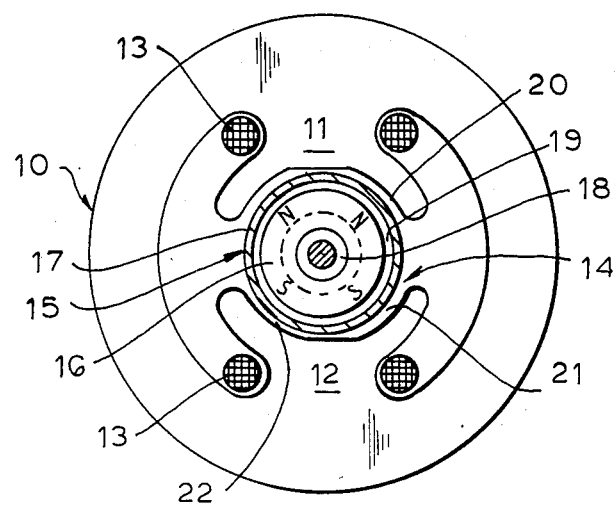

United States Patent [19]
Gerstner et al.

[11] Patent Number: 4,651,040
[45] Date of Patent: Mar. 17, 1987

[54] INDUCTION MOTOR
[75] Inventors: Bruno Gerstner, Bühlertal; Rüdiger Pfeiffer, Ottersweier; Berthold Seng, Bühl, all of Fed. Rep. of Germany
[73] Assignee: Robert Bosch GmbH, Stuttgart, Fed. Rep. of Germany
[21] Appl. No.: 769,625
[22] PCT Filed: Dec. 8, 1984
[86] PCT No.: PCT/DE84/00266
§ 371 Date: Aug. 7, 1985
§ 102(e) Date: Aug. 7, 1985
[87] PCT Pub. No.: WO85/03174
PCT Pub. Date: Jul. 18, 1985
[30] Foreign Application Priority Data
Jan. 2, 1984 [DE] Fed. Rep. of Germany ....... 3400018
Jun. 1, 1984 [DE] Fed. Rep. of Germany ....... 3420370
[51] Int. Cl.⁴ ............................................. H02K 17/00
[52] U.S. Cl. ...................................... 310/166; 310/90; 310/266
[58] Field of Search ................... 310/41, 166, 266, 90, 310/156

[56] References Cited
U.S. PATENT DOCUMENTS
2,159,769 5/1939 MacMillan .................... 310/266 X
2,492,678 12/1949 Amtsberg ........................ 310/266
2,974,242 3/1961 Apstein ........................... 310/260
3,866,071 2/1975 Hallerback ..................... 310/90 X
4,045,698 8/1977 Morrill ............................ 310/90 X FOREIGN PATENT DOCUMENTS
1199390 4/1972 Fed. Rep. of Germany.
1413782 11/1975 United Kingdom.

OTHER PUBLICATIONS
Feinwerktechnik und Messtechnik 87 (1979), pp. 163–169.

Primary Examiner—Donovan F. Duggan
Attorney, Agent, or Firm—Michael J. Striker

[57] ABSTRACT

An induction motor is suggested with a permanent magnet rotor and a stator which is excited electromagnetically by an alternating field, whereby an electrically conductive rotor outer part (17) is mounted between a freely rotatable permanent magnetic rotor inner part (16) and the stator poles (11,12) in the form of a hollow cylinder or a short circuit cage. The rotor outer part (17) rotates in form of a cage runner asynchronous and drives the connected load, after the start of the permanent magnetic inner part (16) which runs synchronous in the continuous operation. A rotating direction arresting device (36,37) assures a defined rotating direction of a drive shaft (27).

18 Claims, 8 Drawing Figures

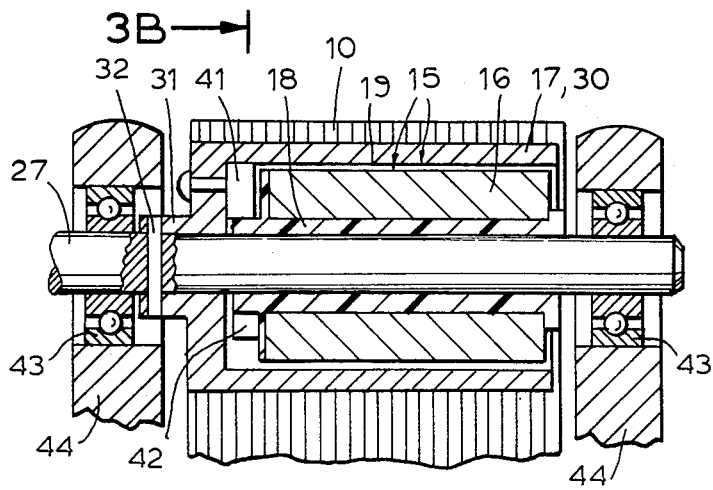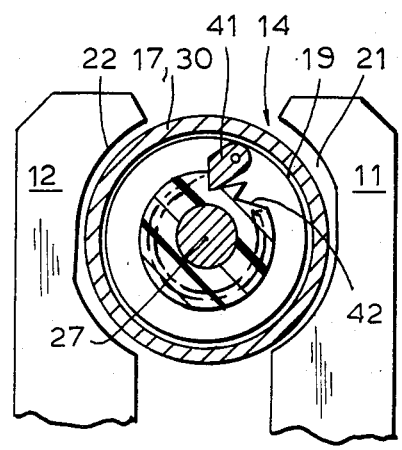
FIG. 3A  FIG. 3B
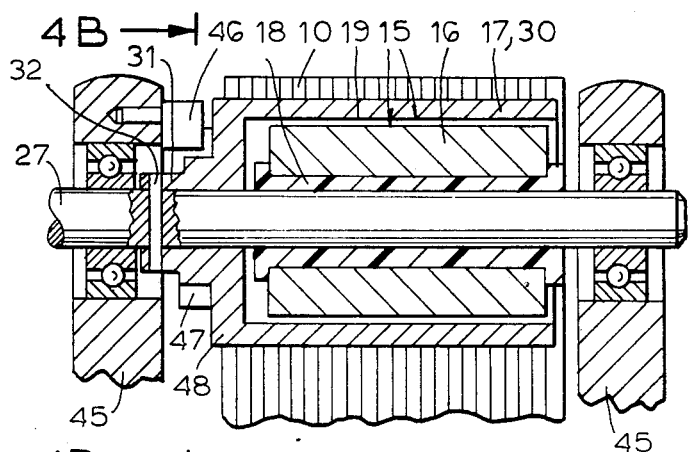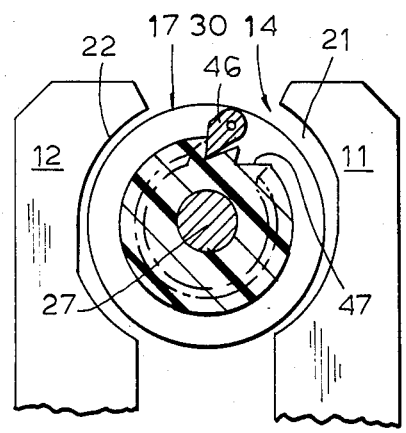
FIG. 4A  FIG. 4B
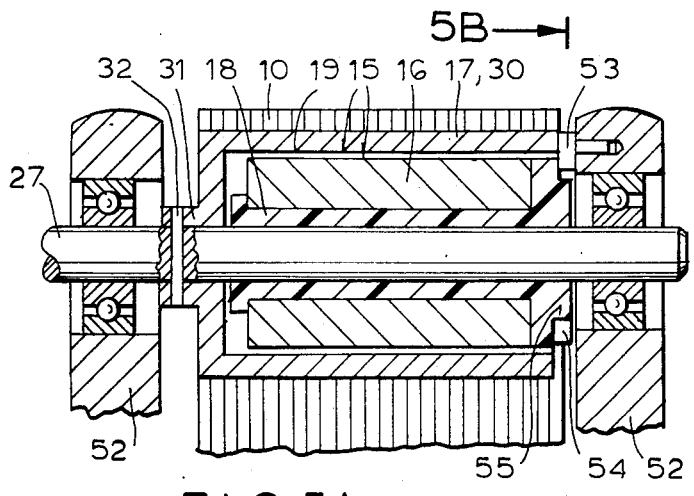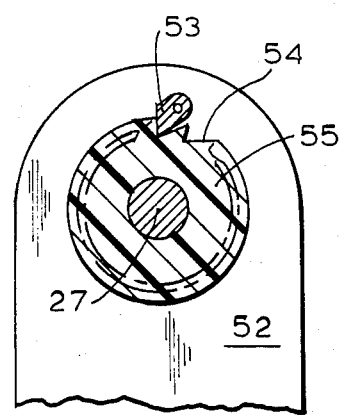
FIG. 5A  FIG. 5B

INDUCTION MOTOR

STATE OF THE ART

The invention is based on an induction motor of the type disclosed in the main claim. Such a motor with a permanent magnetically excited rotor has been already suggested (Feinwerktechnik und Messtechnik 87 (1979), page 163 etc). for generating a starting torque between the rotor and the stator the air space is formed with a different width over the circumference of the rotor, so that a definite rest position of the permanent magnetically excited rotor is the result, which is different from the magnetising direction of the stator. When applying the stator field a force is exerted on the rotor in circumferential direction, whereby the rotor comes into synchronism with respect to the stator field and rotates with the stator field, if need be, after one or a plurality of rotary oscillations. However, the start of the motor is possible only if very low forces engage on the rotor, because otherwise the starting torque is not sufficient to accelerate the rotor to the required angle speed, so that it can reach the syncchronism with the stator field. Due to the low starting torques of such motors, their possibility of use is very limited.

A one phase induction motor is known from DE-PS No. 1 999 390, whose rotor is freely rotatable around a defined angle on a drive shaft, before it gets into a force locking connection with the connection with the drive shaft. The rotor is at first axially displaced towards the stator and is simultaneously accelerated in axial direction and in the circumferential direction by magnetic forces, before it gets into a force locking connection with the drive shaft, after overcoming an axial spring force. The starting torque of such types of motors are limited in light of the partial overlapping of rotor and stator and in light of the brake moment by the drive shaft.

Furthermore, shaded-pole motors are useable for pump drives, for example,. However, they to have only small starting torques despite the realtive large structures and their degree of effectiveness is relatively poor.

Induction motors in accordance with the type of the main claim have no defined rotating direction, if no additional measures are taken for defining the rotating direction. A mechanical arrangement for defining a dined rotating direction of the motor is known from GB-PS No. 1 413 782, for example. Other measures for obtaining a defined rotating direction of the motor exist, for example, by installing free running devices with ball or roller clamping elements in corresponding recesses of a free running element, whereby only one rotating direction is transmitted to the drive shaft. Such arrangements are known, for example, from electric ingnitions for motor vehicles.

ADVANTAGES OF THE INVENTION

In contrast thereto, the induction motor in accordance with the invention with the characterizing features of the main claim has the advantage that a high starting moment is obtained with a small, simple and cost efficient mode of structure, so that the high operating moment of the motor is not reduced by too low starting torques from the idle position, In view of the inventive mode of structure one achieves a uniform, synchronous starting of the motor which is free of short circuits with a simple structure and does not cause any mechanical noises, caused by time delayed acting mechanical clutches, and has a high life span because of its lowest number of parts which wear out.

Advantageous further embodiments and improvements of the motor stated in the main claim are made possible by the measures stated in the subclaims. Particularly advantageous is the design of the outer part of the rotor as an electrically conductive hollow cylinder which preferably consists of copper, because it is particularly easy to make and has a very high conductivity.

The rotor may also be made from an interrupted iron cylinder, instead of a good conductive hollow cylinder, whereby copper rods are inserted into the intermediary spaces. Thereby, the iron parts form flow conducting pieces between the rotor and the stator which reduce the magnetic resistance. A further possibility for designing the rotor is the use of a short circuit cage which has a very low mass and therefore a lower moment of inertia.

A particularly advantageous mode of structure is obtained when the outer rotor part is formed cup like and is preferably mechanically connected with the drive shaft by means of a flange and a pin in the area of the cup bottom. Advantageously, the drive shaft is designed with recessed diameters in such a manner that the inner part of the rotor is freely rotatable on a thinner shaft segment mounted within the outer rotor part which is adjacent on one side to the thicker shaft segment. Thereby, a larger free space is provided within the outer part of the rotor with lower manufacturing efforts in contrast to a continous uniform thick shaft, so that more permanent magnet mass can be accomodated and that a slower friction is obtained. Moreover, the shaft recess provides an abutment for a definite retaining of the inner part of the rotor, so that the mounting of the same is simplified.

In a preferred embodiment of the invention a venting wheel is disposed which rotates with the inner part of the rotor independent from the connected load and cools the outer rotor part, even during idleness and low rotating speeds of the latter.

A particularly simple and cost efficient mode of structure of the motor is obtained with a two pole design of the rotor and the stator. Simple sheet metals are used in this structure in the stator and the magentisation of the rotor is easier than with a higher pole pair number of the same. Advantageously, the inner part of the rotor is diametrically magnetized, because this type of the magnetisation can be more easily accomplished than, for example, a radial magnetisation. Thereby, the rotor inner part may be advantageously designed from permanent magnet partial shells as well as massive.

When using the motor in accordance with the invention for a pumping operation, for example, for the lye pump of a washing machine, the rotating direction of the motor basically does not play any role, because the pump can be so designed that it operates in the same manner in both rotating directions. If only one rotating direction is permissible for the inventive motor, a free running is provided in accordance with the corresponding further embodiments of the invention, which can be constructed as a rotating direction arresting means, in a known manner. This is disposed between the inner part of the rotor and the outer part of the rotor or between a stationary motor part, like a support plate or the like, and the outer part of the rotor or the inner part of the rotor. By using a rotating direction arrest device, a connected pump or the like may be designed for a defined rotational direction, whereby the total degree of efficiency of the arrangement is increased with a low additional effort.

DRAWING

Exemplified embodiments are illustrated in the drawing and are explained in more detail in the following description.

Figure 2:
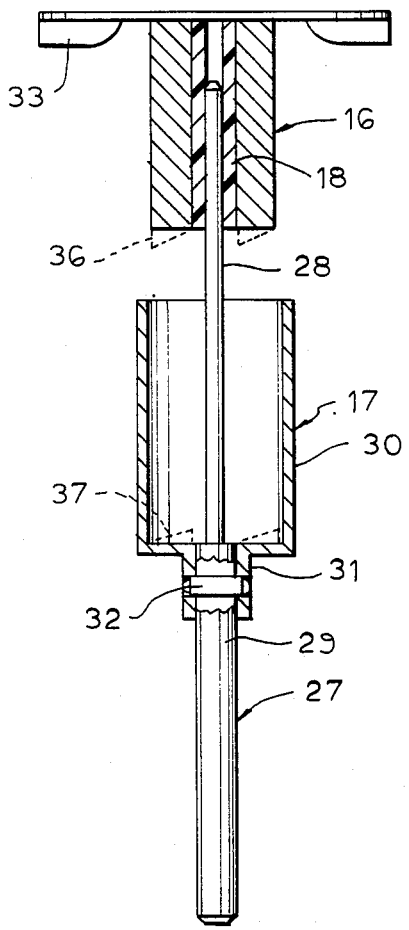

FIG. 1 illustrates a cross sectional view through the inventive induction motor, FIG. 2 a longitudianl section through its rotor and, FIGS. 3 to 5 three different design possibilities of rotational arresting devices

DESCRIPTION OF THE EXEMPLIFIED EMBODIMENT

The stator of an induction motor is designated with the reference numeral 10 in FIG. 1, which is designed as a single phase induction motor being useable for the lye pump of a washing machine, for example. The stator 10 has two distinct poles 11 and 12 which are wound with a single phase alternating current winding 13. The winding may also be mounted on a shank of the stator or on opposite shanks of the stator.

The stator 10 is separated from a rotor 15 by an air slot 14, whereby the rotor is assembled from an inner rotor part 16 and an outer rotor part 17. The inner part 16 of the rotor supports a hub 18 made of plastic in the center thereof, in particular made from polytetrafluorethylene as a support of the rotor.

The air slot 14 of the inventive induction motor divides into an inner air slot 19 between the inner rotor part 16 and the outer rotor part 17 as well as an outer air slot 20 between the outer rotor part 17 and the stator 10. The inner part 16 of the rotor and the outer part 17 of the rotor are independently rotatable because of these two air slots and the separate supports. In the illustrated exemplified embodiment the inner part 16 of the rotor consist of a massive permanent magnet part which is diametrically two pole magnetized. Instead of a massive structure of the inner part 16 of the rotor it may also be composed of two permanent magnet semi cups which are radially or diametrically magnetized, as indicated in dotted lines in FIG. 1.

The outer air slot 20 is provided with a changeable air slot width over the circumference of the rotor, symmetrically with respect to the longitudinal axis of the motor. Thus, a uniform smaller or wider air slot results on radially opposite points of the pole shoes, so that the permanent magnet rotor assumes a defined rest position. The area of the large air slots is designated with the numeral reference 21 and the area of smaller air slot width are designated with the reference numeral 22. The magnetisation direction of the rotor which is shown in the rest position in FIG. 1, deviates from the field direction of the stator, so that a rotating moment is generated between the rotor and the stator during current flow in the stator winding 13.

The two part structure of the rotor can be clearly seen from FIG. 2, whereby the inner rotor part 16 is illustrated outside of the outer rotor part 17 before assembling the parts. A drive shaft 27 which is provided with recessed diameters penetrates both rotor parts. The inner rotor part 16 is freely mounted with its hub 18 on the thinner segment 28, while on the thicker segment 29 the cup shaped outer rotor part 17 is mechanically mounted in the area of the cup bottom. Preferably, the outer rotor part 17 consists of a hollow cylinder 30 made of copper which continues in form of a flange 31 in the area of the cup bottom and which is retained fixedly on the thicker segment 29 of the drive shaft 27 by means of a pin 32.

A vent 33 is mounted on the front face of the inner rotor part 16 associated to the open end of the hollow cylinder 30 which rotates with the free rotatably inner rotor part 16, thus always providing a sufficient cooling for the outer rotor part 17.

On the bottom of the outer part of the rotor and on the associated front face of the inner part of the rotor a free ruuning means is indicated with dash-dot lines acting as a rotating direction arresting device with schematically illustrated lock pawls 36 and 37 which permit only one rotation in one rotating direction of the rotor inner part to the rotor outer part. Thus, the motor can only start in one rotating direction, so that it is also suitable for applications in which only one rotating direction is permissible with this additional measure. The rotating direction arresting device will be explained later in more detail in conjunction with FIGS. 3 to 5.

The arrangement in accordance with the invention operates as follows:

After applying an alternate voltage on winding 13 a vertical magnetic alteranting field is generated as shown in FIG. 1, which is rotated in a predetermined angle in the rest position with respect to the permanent magnetic field of the inner part 16 of the rotor. The permanent magnet rotor directs itself in the rest position in such a manner that the flow finds the path of the least magnetical resistance, e.g., in the N-S position illustrated in FIG. 1. After switching on the stator field, the inner rotor part 16 can perform rotating oscillations unhindereed on segment 28 of drive shaft 27, as long as the acceleration is sufficient to provide a net synchronous rotation. With a two pole mode of structure of the stator and the rotor and a net frequency of 50 Hz of the current in the stator winding 13 it results in 3000 rotation per minute. The inner rotor part 16 is not admitted by the connected load, so that nothing is in the way of the start of the motor. When rotating the permanent magnet inner rotor part 16 a rotating field is generated which induces flows in the outer rotor part 17, thus causing it to rotate. The outer rotor part 17 then runs asynchronous with a slippage being dependent from the outer connected load within the rotating field generated by the inner rotor part 16. Therefore, the speed of the outer rotor part 17, in the exemplified embodiment of the hollow cylinder 30 with the shaft 27, is always below the synchronous speed of the inner rotor part.

Due to the inventive type of structure one obtains a small, light and cost efficient motor with a high starting torque which can replace known motors with substantially higher structural volume, in particular shade-pole motors. The described exemplified embodiment represents only one possible structural form of the inventive motor, naturally instead of the two pole type of structure multipole devices of rotor and stator may be used. Furthermore, the hollow cylinder 30 does not have to be open on one side only, but may be open or closed on both sides, or may be closed by an electrically nonconductive part. The vent wheel 33 may be discarded when the motor is subjected to low loads.

In the inventive type of motor a large part of the magnetisation requirement is not delivered from the winding 13 or its alternating voltage supply, but is covered by the synchronous rotating permanent magnet rotor inner part 16, in contrast to the known asynchronous motors. This generates a rotating field without using auxilliary windings, without which a shade-pole motor would not start, for example. Despite of the enlargement of the air slot 14 by the outer rotor part 17 the inventive motor has a high degree of efficiency and a low output charge weight, as well as a low volume. The structure and manufacturing of the motor are simple, so that it can be produced with low process technical effort. The number of the parts which wesr out has been reduced to a minimum.

FIGS. 3 to 5 illustrate further constructive modifications of a motor with a rotating direction arrest, as was already explained in principle in conjunction with FIG. 2. The same reference numerals are used for the same parts in FIGS. 3 to 5 as used in FIGS. 1 and 2, even if different designs are present as far as the structure is concerned.

FIG. 3 illustrates an induction motor wherein a rotation direction arrest is provided between the rotor inner part 16 and the rotor outer part 17. Corresponding to the parts 36 and 37 schematically illustrated in FIG. 2, a ratchet pawl 41 and a gear 42 are provided in accordance with FIG. 3. The ratchet pawl 41 is retained pivotably on the outer rotor part and blocks a rotating direction of the inner rotor part 16 by engaging the gear 42. The ratchet pawl 41 is pivotably mounted on the bottom of the cup like outer rotor part 17, 30, while the gear 42 is worked into an axial projection of the plastic hub 18.

As can be seen from FIG. 3a, theouter rotor part 17 with the drive shaft 27 is rotatably mounted in two ball bearings 43 in one each mounting plate 44.

FIG. 3b shows a section in accordance with line B—B in FIG. 3a, whereby the rotating direction arrest with the ratchet pawl 41 and the gear 42 can be seen more clearly. A rotation of the inner rotor part is blocked in clockwise direction with the arrangement shown , while during a rotation in counterclockwise direction the ratchet pawl 41 is lifted and the inner rotor part 16 is able to rotate below the ratchet pawl 41. Thereby, the permanemt magnetic inner rotor part 16 cannot overcome the relative large mass inertia moment of the outer rotor part 17 and cannot accelerate it, so that the rotating direction arrest in form of mechanical arresting members can be immediately mounted between the inner rotor part 16 and the outer rotor part 17.

FIG. 4 illustrates an arrangement, whereby the rotating direction is mounted between the outer rotor part 17 and a stationary mounting of the motor. The stationary mounting is the left of the two mounting plates 45 on which a ratchet pawl 46 is pivotably mounted. The ratchet pawl 46 acts together with a gear 47 on bottom 48 of the outer rotor part 17. On the bottom thereof is a flange 31 from which the gear 47 protrudes radially outwardly (FIG. 4a).

FIG. 4b shows a section along line B—B in FIG. 4a, which runs directly through the ratchet pawl 46 and the gear 47. In this case the rotating direction blocks a rotation of the outer rotor part in the clockwise direction, whereby the inner rotor part 16 must be dimensioned in such a way that it falls out of a synchrnous movement at a defined load moment, so that it cannot start during the fixedly braked outer rotor part 17. Therefore, if one rotating direction of the outer rotor part is blocked, the permanent magnet inner rotor part 16 can only move into the other roatting direction counterclockwise, whereby the rotating direction of the outer rotor part 17 and thereby the rotating direction of the drive shaft 27 is also determined in the same manner.

FIGS. 5a and 5b show a further modification of the rotating arresting device which is provided between the inner rotor part 16 and a stationary support in form of the right mounting plate 52 of the motor. Again a ratchet pawl 53 serves as the arresting member which is pivotably retained on support plate 52 and coacts with a gear 54 on the inner rotor part 16. The gear 54 is worked into a radial extension of hub 18 of the inner rotor part 16 (FIG. 5a).

FIG. 5b shows a section in accordance with line B—B in FIG. 5a, from which the design of the rotating arresting device is clearly recognizeable. The ratchet pawl 53 engages into the gear 54 in such a manner that a rotating of the inner rotor part is blocked in the clockwise direction, while the rotating direction counterclockwise is free due to the lifting of the ratchet pawl 53. As long as the inner rotor part 17 remains arrested, no voltages are induced in the outer rotor part 17, e.g., that the outer rotor part 17 and the drive shaft 27 can rotate only in the predetermined counterclockwise direction.

We claim:

1. An induction motor preferably for pump drives, comprising:

a rotor having a rotor inner part and a rotor outer part;

at least one permanent magnet supported by said rotor inner part;

a stator surrounding said rotor inner part circumferentially such that an air space is formed therebetween, said rotor outer part being arranged between said stator and said rotor inner part in said air space, said air space having a width between said rotor outer part and said stator which varies around said rotor outer part to define an air space shape, said stator being excitable by an alternating electromagnetic field to provide a stator magnetic field direction for generating a starting torque, said rotor inner part being movable into a rest position because of said air space shape to provide a rotor magnetic field direction which is different from said stator magnetic field direction, said rotor inner part being rotatable synchronously with respect to said stator field direction, said rotor outer part being rotatable with respect to said rotor inner part and being rotatable asynchronously with respect to said stator field direction; and a drive shaft connected to said rotor outer part, said rotor outer part being formed as an electrically conductive hollow cylinder.

2. Induction motor in accordance with claim 1, characterized in that the rotor outer part (17) is composed of a copper hollow cylinder.

3. Induction motor in accordance with claim 2, characterized in that the rotor outer part (17) is cup shaped and is mechanically connected to the drive shaft in the area of the cup bottom.

4. Induction motor in accordance with claim 2, characterized in that the drive shaft (27) has a thinner shaft portion and a thicker shaft portion, said rotor inner part (16) being freely rotatable on said thinner shaft portion (28) within said rotor outer part (17), said rotor outer part having a side connected to said thicker shaft portion (29).

5. Induction motor in accordance with claim 4, characterized in that the rotor outer part (17) is fixedly mounted on the thicker shaft segment (29).

6. Induction motor in accordance with claim 2, characterized in that a vent (33) is provided on the inner rotor part (16).

7. Induction motor in accordance with claim 2, characterized in that the permanent magnetic rotor inner part (16) is designed with two poles and is diametrically magnetized.

8. Induction motor in accordance with claim 2, characterized in that the rotor inner part (16) is assembled from two permanent magnet half shells.

9. Induction motor in accordance with claim 1, characterized in that the rotor inner part (16) is designed as a unitary piece made from permanent magnet material.

10. Induction motor in accordance with claim 2; further comprising:
   a hub (18) inserted axially into said rotor inner part (16) and composed of plastic and mounted on said drive shaft (27, 28) with a slight bearing clearance.

11. Induction motor as defined in claim 10, wherein said plastic is polytetrafluorethylene.

12. Induction motor in accordance with claim 2, characterized in that said rotor inner part is rotatable in at least one direction; further comprising:
   means for blocking said rotor inner part from rotating in said one direction, said blocking means being mounted between said rotor inner part (16) and said rotor outer part (17), to thereby define a predetermined rotating direction of the drive shaft (27).

13. Induction motor in accordance with claim 12, characterized in that said blocking means includes at least one ratchet pawl (53) pivotably retained on said rotor outer part (17), and a gear (54) on said rotor inner part.

14. Induction motor in accordance with claim 7, wherein said stator has an asymmetric construction.

15. Induction motor in accordance with claim 7, wherein said inner part is rotatable in at least one direction; further comprising:
   means for blocking said inner part from rotating in said one direction; and
   means for supporting said motor, said supporting means being stationary, said blocking means being mounted between said rotor outer part and said supporting means.

16. Induction motor in accordance with claim 15; further comprising:
   a plate mounting said motor, said rotor outer part being cupped shaped and having a bottom area, said blocking means including at least one ratchet pawl pivotably mounted on said plate, and a gear in said bottom area.

17. Induction motor in accordance with claim 2, wherein said inner part is rotatable in at least one direction; further comprising:
   means for blocking said inner part from rotating in said one direction; and
   means for mounting said motor, said mounting means being stationary, said blocking means being mounted between said rotor inner part and said mounting means.

18. Induction motor in accordance with claim 17; further comprising:
   a support plate supporting said motor, said blocking means including at least one ratchet pawl pivotably mounted on said support plate, and a gear on said rotor inner part.

* * * * *